United States Patent [19]

Jajszczyk et al.

[11] Patent Number: 4,956,840
[45] Date of Patent: Sep. 11, 1990

[54] MULTISTAGE DIGITAL SWITCHING NETWORK

[75] Inventors: Andrzej Jajszczyk; Wojciech Kabacinski, both of Poznan, Poland

[73] Assignee: Politechnika Poznanska, Poznan, Poland

[21] Appl. No.: 279,314

[22] Filed: Dec. 1, 1988

Related U.S. Application Data

[63] Continuation of Ser. No. 891,211, Jul. 28, 1986, abandoned.

[30] Foreign Application Priority Data

Aug. 12, 1985 [PL] Poland .................................. 254969
Mar. 25, 1986 [PL] Poland .................................. 258628

[51] Int. Cl.$^5$ ................................................ H04J 3/02
[52] U.S. Cl. ................................. 370/65.5; 370/58.1; 340/825.8
[58] Field of Search .................... 370/58, 60, 16, 59, 370/65.5; 340/825.8

[56] References Cited

U.S. PATENT DOCUMENTS

| | | | |
|---|---|---|---|
| 4,023,141 | 5/1977 | Hwang ............................ | 340/825.8 |
| 4,417,245 | 11/1983 | Melas et al. ...................... | 340/825.8 |
| 4,425,640 | 1/1984 | Philip et al. ..................... | 370/58 |
| 4,587,649 | 5/1986 | Maddern ......................... | 370/58 |
| 4,598,399 | 7/1986 | Bath ................................ | 370/16 |
| 4,695,999 | 9/1987 | Lebizay .......................... | 370/58 |
| 4,785,446 | 11/1988 | Dias et al. ...................... | 370/60 |

OTHER PUBLICATIONS

"Novel Architecture for a Digital Switching Network," *Electronics Letters*, vol. 20, No. 17, Aug. 6, 1984, p. 683.
"Reliable Digital Switching Networks," *Electronics Letters*, vol. 22, No. 2, Jan. 16, 1986, pp. 93 to 94.
"Cost-Effective Digital Switching Network," *Electronics Letters*, vol. 21, No. 20, Sep. 26, 1985, pp. 909 to 910.
"Methods for the Connection of Signalling Units to Switching Networks," *Electronics Letters*, vol. 23, No. 9, Apr. 23, 1987, pp. 443 to 444.
Jajszczyk, A., "A Dynamic Programming Approach to Optimization of Switching Networks Composed of Digital Switching Matrices," IEEE Transactions on Communications, vol. COM-35, No. 12, Dec., 1987, pp. 1342 to 1346.
Belforte, P., et al., "Design and Development of an LSI Digital Switching Element (ECI)," *CSELT Rapporti Tecnici*, vol. XIII, No. 2, Apr., 1984, pp. 115 to 123.
Jajszczyk, A., et al., *An Expansion Architecture For Switching Networks*, Technical University of Poznan, Poznan, Poland, May, 1988.
Das Digitalkoppelnetz in System EWSD; Karlheinz Neufang Telecom Report 4(1981); pp. 28-32.
An Introduction to Digital Integrated Communications Systems; H. Inosf; pp. 141-145.
DTS-1 Speech Path System; Kazuo Kurahashi, Tetsuaki Egawa, Iwao Shimizu and Masahiko Itoh; pp. 728-739.
ITT 1240 Digital Exchange Digital Switching Network; J. M. Cotton, K. Giesken, A. Lawrence, D. C. UPP; pp. 148-160.
Jajszczyk, A., "On Nonblocking Switching Networks Composed of Digital Symmetrical Matrices", *IEEE Transactions on Communications*, vol. COM-31, No. 1, Jan., 1983, pp. 2 to 9.
Frank, W., et al., "System to 12 Dual Port Switch", *Electrical Communication*, vol. 59, No. 1/2, 1985, pp. 54 to 59.

Primary Examiner—Douglas W. Olms
Assistant Examiner—Min Jung
Attorney, Agent, or Firm—Ladas & Parry

[57] ABSTRACT

A multistage digital switching network for use in telecommunications has two identical subnetworks. Each of the subnetworks consists of three modules which are connected in series. In one embodiment, the subnetworks are connected through additional modules identical to the middle module of the series of the subnetworks. In another embodiment, otherwise unused outputs of the middle modules of the subnetworks are used for the connections between the subnetworks.

2 Claims, 2 Drawing Sheets

MULTISTAGE DIGITAL SWITCHING NETWORK

This is a continuation of co-pending application Ser. No. 06/891,211 filed on July 28, 1986, now abandoned.

DESCRIPTION

1. Technical Field

This invention relates to digital switching systems. In particular, it relates to a multistage digital switching network which is particularly useful for the construction of a telecommunication system and especially for telephone exchanges.

2. Background of the Invention

In some well-known multistage switching networks, such as are described in publications, such as K. Neufang, "Das Digitalkoppelnetz im System EWSD", Telcom Report, 1981, 4, pages 28 to 32 and H. Inose, "An Introduction to Digital Integrated Communications Systems", Peter Peregrinus Ltd., 1979, pages 141 to 145, two identical and independent networks have been used. In case there is a fault in one subnetwork, the second one can work alone. The line concentrating unit of an exchange is connected to such a switching network by PCM links, from which each is connected to both subnetworks.

In another, such as is described in K. Kurahashi, T. Egawa, J. Shimizu, and M. Itoh, "DTS-1 Speech Path System". Rev. Electr. Commun. Lab., 1979, 27, pages 732–739, a duplication of the middle space stage of the switching network has been used and an additional switch for each external time stage has been provided.

In another, such as is described in J. M. Cotton, K. Giesken, A. Lawrence, and D. C. Upp, "ITT 1240 Digital Exchange: Digital Switching Network", Electr. Commun. 1981, 56, pages 148 to 160, line equipment is connected to the switching network through a double access switch. This connection consists of two PCM links, where one link is connected to one access switch of the pair.

In all these, in order to increase the reliability of operation, a duplication of all or some network elements has been used. Moreover, specialized switching equipment has been added to the number of digital switches has been increased. Such approaches, although effective, are very expensive and material-consuming. Switching networks structures obtained by using these approaches are very complicated.

SUMMARY OF THE INVENTION

It is an object of the invention to provide a multistage switching network which is highly reliable, composed of standard switching elements, less complicated and of lower production cost.

According to the invention, a switching network is composed of two subnetworks, each of which consists of three modules connected in series. Each of the said modules is either a single switching element or constitutes a single-stage or multi-stage switching network. Both subnetworks are interconnected in that the inputs of the middle module of the first subnetwork are connected, through an additional connecting module with the outputs of the middle module of the second subnetwork. The two connecting modules which so interconnect the subnetworks are identical with the middle modules of both subnetworks.

According to an alternative, both subnetworks are interconnected by connecting unused (i.e. not connected to the last module) outputs of one middle module are connected to inner-module links of the second subnetwork and the unused outputs of the second middle module are connected to inter-module links of the first subnetwork.

BRIEF DESCRIPTION OF THE DRAWINGS

Embodiments of the invention will now be described with reference to the accompanying drawing, wherein.

DETAILED DESCRIPTION

Figure 1:
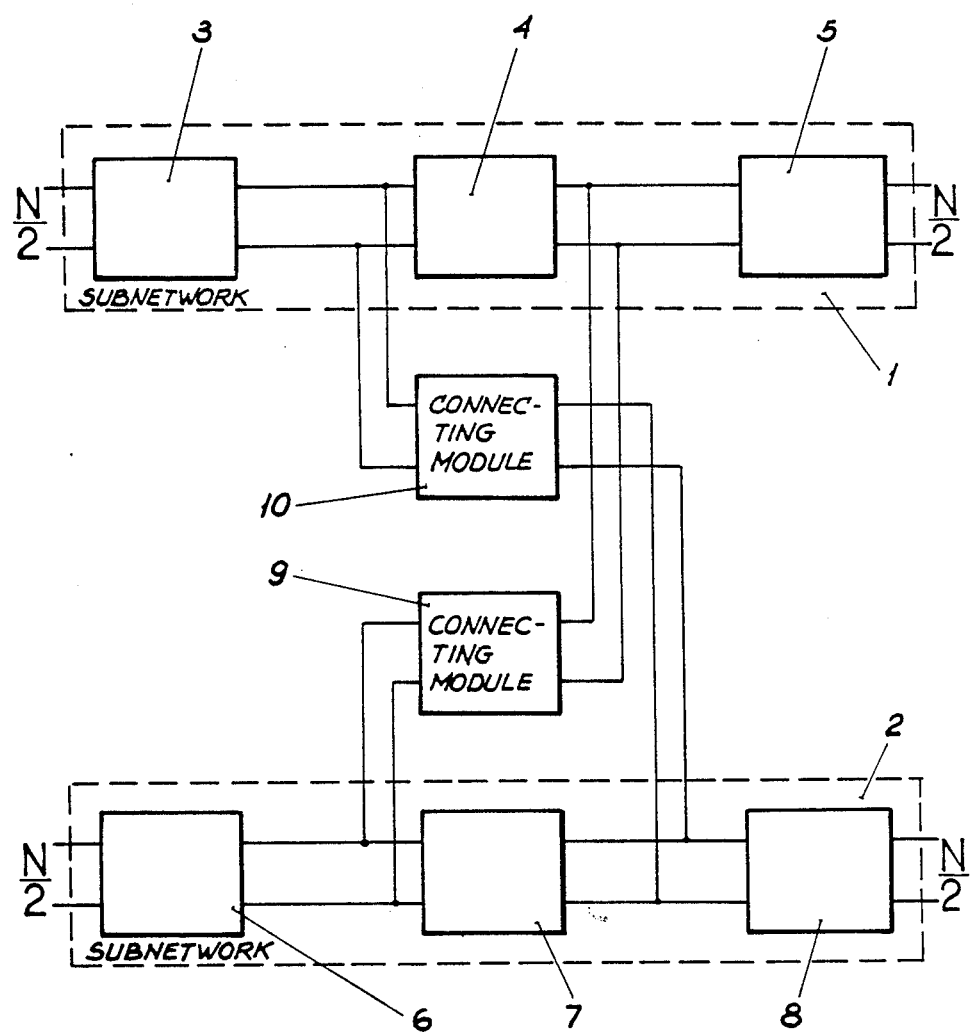
FIG. 1 shows a block diagram of a general multistage network having a capacity of N PCM links.

The general structure of a network in FIG. 1 has a capacity of $N \times N$ PCM links and consists of two subnetworks 1 and 2, each of these subnetworks having a capacity of $N/2 \times N/2$ PCM links. Each of the subnetworks consists of three modules 3, 4, 5 and 6, 7, 8, respectively connected in series. Each of the modules is either a single switching element or a single-stage or multi-stage switching network. The networks 1 and 2 are interconnected in that the inputs of the middle module 4 of the first subnetwork 1 are connected through the additional connecting module 10 with the outputs of the middle module 7 of the second subnetwork 2, and the inputs of the middle module 7 are connected through the additional connecting module 9 with the outputs of the middle module 4. The additional connecting modules 9 and 10 are identical to the middle modules 7 and 4, respectively.

Figure 2:
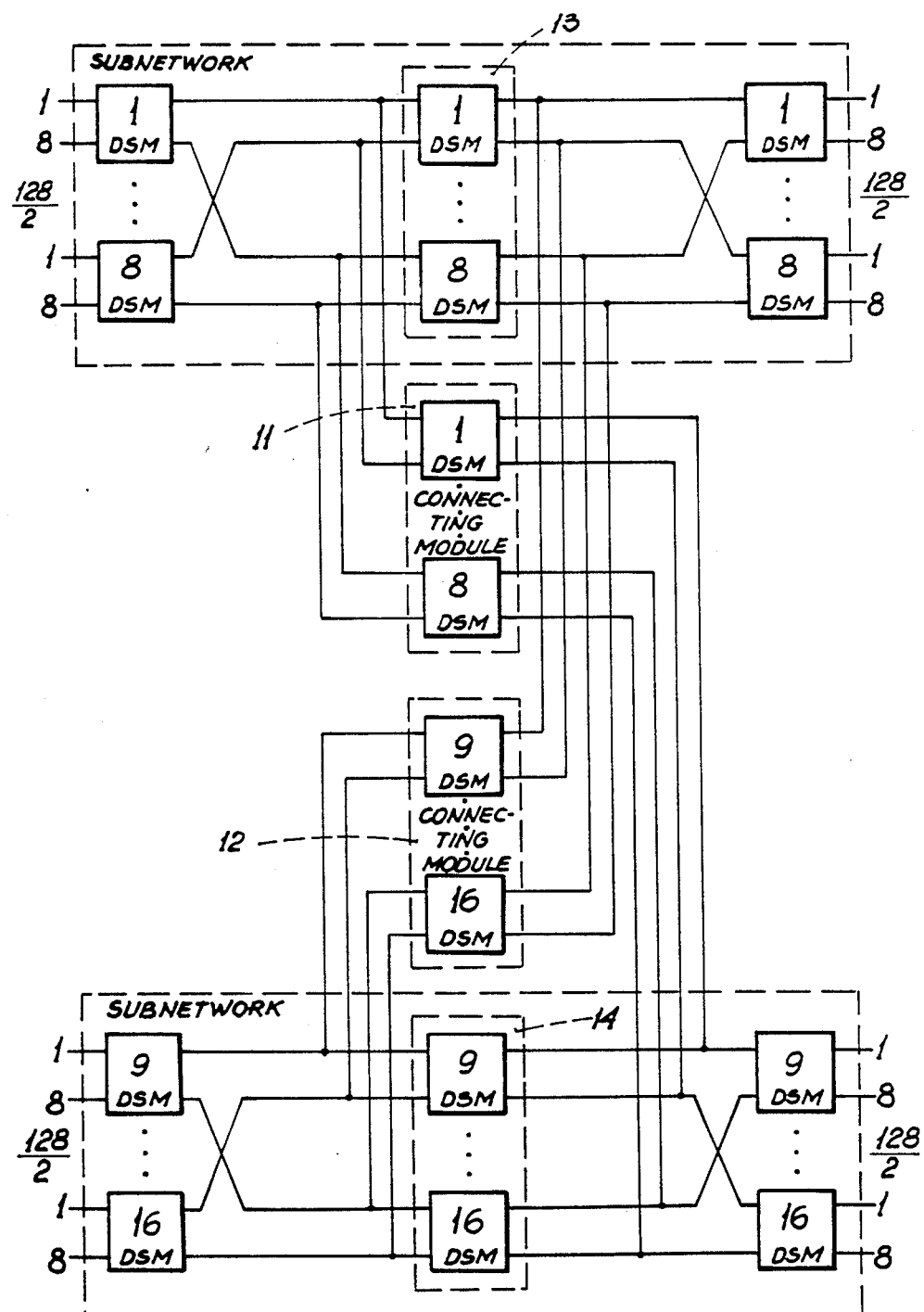
FIG. 2 shows a diagram of a three-stage network having a capacity of 128 PCM links.

In the embodiment of the invention illustrated in FIG. 2, a switching network having a capacity of 128 PCM links is constructed of digital switching modules (DSM) having a capacity of a $8 \times 8$ PCM links. The subnetworks are connected through connecting modules 11 and 12, which are identical to the middle stages 13 and 14 of the subnetworks.

We claim:

1. A multistage digital switching network composed of two, first and second, identical subnetworks each of said subnetworks having a capacity of $N/2 \times N/2$ PCM links, characterized in that each of said subnetworks consists of three, first, middle and last modules connected in series, wherein each of said modules constitutes either a single switching element or a single-stage switching network or a multi-stage switching network, inputs of said middle module of said first of said subnetworks being connected through an additional connecting module with outputs of said middle module of said second of said subnetworks; and inputs of said middle module of said second of said subnetworks being connected through another additional connecting module with outputs of said middle module of said first of said subnetworks; said additional connecting modules being identical to said middle modules of said subnetworks.

2. A multistage digital switching network, comprising:

first and second identical subnetworks, each subnetwork having a capacity of $N/2 \times N/2$ PCM links and consisting of first, middle and last modules having inputs and outputs, the modules being connected in series with the inputs and outputs of the middle module being connected respectively to the outputs and inputs of the first and third modules of the series, each of the modules being one of a single switching element, a single-stage switching network or a multi-stage switching network whereby, because the subnetworks are identical, the middle modules thereof are identical; and two additional modules, the inputs of the middle module of the first of the subnetworks being connected through one of the additional modules with the outputs of the middle module of the second of the subnetworks, and the inputs of the middle module of the second of the subnetworks being connected through the other of the additional modules with the outputs of the middle module of the first of the subnetworks, the additional modules being identical to the middle modules of the subnetworks.

* * * * *